United States Patent [19]

Oishi et al.

[11] Patent Number: 4,631,620
[45] Date of Patent: Dec. 23, 1986

[54] MAGNETIC DISK CARTRIDGE

[75] Inventors: Kengo Oishi; Shingo Katagiri, both of Odawara, Japan

[73] Assignee: Fuji Photo Film Co., Ltd., Japan

[21] Appl. No.: 712,979

[22] Filed: Mar. 18, 1985

[30] Foreign Application Priority Data

Apr. 12, 1984 [JP] Japan .............................. 59-54592[U]

[51] Int. Cl.$^4$ ........................................... G11B 23/03
[52] U.S. Cl. .................................... 360/133; 360/135
[58] Field of Search .......................... 360/97, 99, 133; 206/444; 369/261, 270

[56] References Cited

U.S. PATENT DOCUMENTS 3,729,720  4/1973  Darling et al. .................... 360/99 X
3,947,893  3/1976  Hall, Sr. ............................. 360/133
4,549,922  10/1985  Oishi et al. ..................... 360/133 X
4,581,670  4/1986  Nemoto et al. ..................... 360/133

Primary Examiner—Robert S. Tupper
Assistant Examiner—Andrew L. Sniezek
Attorney, Agent, or Firm—Pasquale A. Razzano

[57] ABSTRACT

The magnetic disk of a magnetic disk cartridge is provided with a center core assembly which comprises a main core, an upper core with grooves on one side for engagement with the ridges of a ridged, resilient ring which is provided on its non-engagement side with double-sided adhesive tape for holding the disk onto the ring. The disk attached to the ring can be held lightly but securely between the upper and main parts of the center core without the need to apply excessive clamping force.

2 Claims, 3 Drawing Figures

MAGNETIC DISK CARTRIDGE

BACKGROUND OF THE INVENTION

1. Field of the Invention

This invention relates to a magnetic disk cartridge employed for the purpose of recording and reproduction of voice, image and other such data. More particularly, this invention relates to an improved structure for affixing the magnetic disk of the cartridge to the rotational support means.

2. Description of the Prior Art

In recent years, in response to the demands of the information society, magnetic recording media have come into widespread use. The magnetic disk, in particular, is rapidly becoming very popular because it is simple and convenient to operate. Because it is extremely easy to randomly access magnetic disks, such disks are now playing an essential role as the recording media in small computers, word processors and other such office automation equipment. And still more recently such features of magnetic disks have caused them to become a focus of attention in a smaller form—the microfloppy disk—for use as the recording media of electronic still cameras (for example Sony Corp.'s "Mavica"). For handling and operational convenience these microfloppy disks are used in the form of a magnetic disk cartridge consisting of a casing within which is housed the disk, and a center core which supports the disk for the rotation thereof. This center core usually consists of a main core upon which is laid a resilient ring and an upper core, in that order, with the disk being pressed against the main core by one entire side of the resilient ring, so the disk is held by the surface frictional forces between it and the resilient ring.

With the above magnetic disk cartridge, however, the upper core pressing the resilient ring onto the disk can produce directional stresses where the ring contacts the disk, causing deformation of the disk.

When the core proper is ultrasonically welded to the upper core the ultrasonic vibration can make such deformation particularly noticeable.

If a disk is deformed the gap between the magnetic recording/reproduction head and the disk surface during recording/reproduction operations will be uneven, with a consequent deterioration in recording/reproduction characteristics.

In the case of microfloppy disks, even very slight deformation can facilitate the occurrence of data recording/reproduction errors.

SUMMARY OF THE INVENTION

The object of the present invention is to provide a magnetic disk cartridge which can be efficiently fabricated with the disk attached to the center core so that the disk is flat and stable in rotation, reducing the deformation of the disk occurring during the assembly of the cartridge.

The present invention comprises a magnetic disk cartridge provided with a center core for supporting a magnetic disk within which is a resilient ring on one side of which are formed radial extending ridges and which is provided on the other side with double-sided adhesive tape; an upper core of which the surface that contacts the resilient ring is provided with radially extending grooves which are arranged so that when the magnetic disk cartridge is assembled the ridges of the resilient ring fit into the grooves of the upper core.

The ridges of the resilient ring may be provided on both sides of the ring. Therefore, a ring which is circumferentially corrugated on both sides thereof may be used as the resilient ring.

In assembling the magnetic disk cartridge center core of the present invention, the disk is affixed to the resilient ring by the double-sided adhesive tape provided on one side of the ring, and the resilient ring and the upper core are joined by the engagement of the ridges of the ring with the grooves of the upper core. By further joining the upper core and the main core, such as by ultrasonic welding, the disk will effectively be joined to the main core so that the disk is adequately attached to the main core proper even without the application of major pressure by the upper core and main core.

Therefore, with the magnetic disk cartridge according to this invention, disks are not subjected to deformation caused by the application of powerful pressure, such as is the case with conventional disk cartridges, so recording/reproduction can proceed with the disk always in a good condition for the recording/reproduction head.

DESCRIPTION OF THE PREFERRED EMBODIMENT

Figure 1:
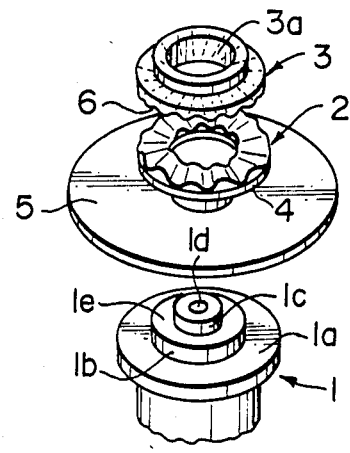
FIG. 1 is an exploded perspective view of an embodiment of the magnetic disk cartridge according to the present invention.
Figure 2:
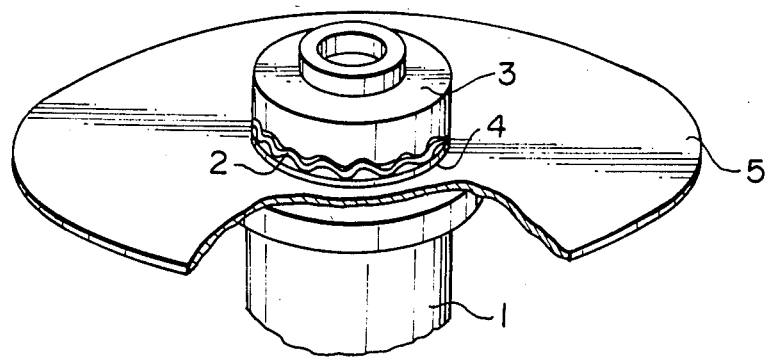
FIG. 2 is a perspective view showing the parts of FIG. 1 in an assembled state.
Figure 3:
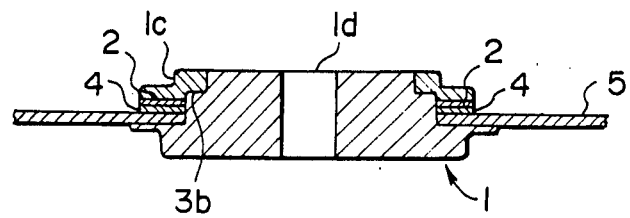
FIG. 3 is a cross-sectional view of the parts shown in FIG. 2.

The present invention will now be described in further detail with reference to the accompanying drawings.

In the figures, a rotational support means is comprised of a main core 1 on which is placed concentrically a ridged ring 2 and an upper core member 3, in that order. The lower surface of the ridged ring 2 is provided with double-sided adhesive tape 4 which serves to fasten the ridged ring 2 concentrically to the magnetic disk 5. Radially extending grooves are provided on the lower surface of the upper core 3 for the purpose of engagement with the ridges of the ring 2. The main core 1 also has a surface portion 1a for supporting the disk 5, and on the surface portion 1a a step portion 1b from which extends a lip 1c formed concentric to the main core 1. A through hole 1d is formed along the axis thereof for the insertion of a drive shaft (not shown). The upper core 3 is provided at its center with an opening 3a for the insertion therein of the lip 1c of the main core 1. When the lip 1c is in the opening 3a, the ridged ring 2 and the double-sided adhesive tape 4 provided on the lower surface of the ring 2 for holding the disk 5 are lightly sandwiched between the main core 1 and the upper core 3. At this point the upper surface 1e of the step portion 1b of the main core 1 is ultrasonically welded to the lower face of the upper core 3.

A soft, resilient material such as a polyolefine resin, rubber or the like is used to form the circumferetial corrugations of the ring 2. In size, the ring may have an outside diameter in the order of, for example, 16 mm and an inside diameter of 12 mm. Also, any thin, nonbase double-sided adhesive tape can be used (Nitto Electric Industrial Co.'s #593 being one example).

The grooves 6 of the upper core 3 are deep enough to preclude circumferential slippage occurring in the engagement with the ridges of the ridged ring 2 during recording/reproduction operations. It is moreover not essential that the grooves 6 be precisely the same in number and spacing as the ridges of the ring 2; it is sufficient if just one portion is provided with grooves for engagement with the ridges.

Thus, in a magnetic disk cartridge formed according to the above embodiment, the disk 5 is affixed to the lower surface of the ridged ring 2 by the double-sided adhesive tape 4, the ridged ring 2 is joined to the upper core 3 by the engagement of the ridges of the ring with the grooves 6, and the upper core 3 is ultrasonically welded to the main core 1, so that when the cartridge is assembled the disk 5 becomes integrally affixed to the main core 1, thereby eliminating the need to use powerful pressure to clamp the disk as is the case with conventional methods. Therefore, with the present invention the disk is virtually free of the deformation the powerful clamping force used in conventional methods produces.

Also, because in this embodiment of the present invention the ridged ring 2 and the disk 5 are held gently between the main core 1 and the upper core 3, and the main core 1 side of the ridged ring 2 is provided with radial ridges, the disk 5 is subjected to a light holding pressure exerted by the ridges, and the frictional force the ridges exert on the surface of the disk via the double-sided adhesive tape 4 prevents rotational movement of the disk 5 relative to the ring 2. This means that the adhesiveness of the double-sided adhesive tape together with the pressure exerted on the disk by the ridges of the ring 2 enable the disk to be rotated integrally with the rotation of the ridged ring 2.

Although in the above embodiment the resilient ring is in the form of a ring which has ridges on both sides, the resilient ring is not limited to this form, and may instead have ridges formed only on the side facing the upper core, with the other side being flat.

Also, instead of the use in this embodiment of ultrasonic welding to fix the upper core to the main core, a similar effect may also be obtained with other fixing means, such as caulking.

What is claimed:

1. A magnetic disk cartridge comprising
   a disk-shaped recording medium formed of a flexible material;
   a center core disposed at the center of said recording medium for the rotation thereof which comprises a main core, a resilient ring and an upper core arranged concentrically one on the other in that order, with the recording medium being held between the main core and the resilient ring; and
   a cartridge casing which integrally houses said recording medium and said center core;
   wherein the resilient ring has radially extending ridges formed on the side which contacts the upper core and is provided on its other side with double-sided adhesive tape, and the upper core is provided with a plurality of grooves extending radially across the whole of the surface which comes into contact with the resilient ring for engagement with the ridges of the resilient ring.

2. The magnetic disk cartridge according to claim 1 in which the resilient ring is a corrugated ring with the corrugations running circumferentially.

* * * * *